US011363585B2

United States Patent
Zhang et al.

(10) Patent No.: US 11,363,585 B2
(45) Date of Patent: Jun. 14, 2022

(54) METHOD AND APPARATUS FOR OBTAINING DOWNLINK CHANNEL INFORMATION

(71) Applicant: HUAWEI TECHNOLOGIES CO., LTD., Guangdong (CN)

(72) Inventors: Min Zhang, Chengdu (CN); Yingfei Diao, Shanghai (CN); Guangwei Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 16/906,292

(22) Filed: Jun. 19, 2020

(65) Prior Publication Data

US 2020/0322933 A1 Oct. 8, 2020

Related U.S. Application Data

(63) Continuation of application No. PCT/CN2018/118998, filed on Dec. 3, 2018.

(30) Foreign Application Priority Data

Dec. 20, 2017 (CN) .......................... 201711386200.5

(51) Int. Cl.
*H04W 72/04* (2009.01)
*H04B 7/0456* (2017.01)

(52) U.S. Cl.
CPC ........ *H04W 72/042* (2013.01); *H04B 7/0456* (2013.01)

(58) Field of Classification Search
CPC .................................................. H04W 72/042
See application file for complete search history.

(56) References Cited

U.S. PATENT DOCUMENTS

2016/0173256 A1    6/2016  Seo et al.
2017/0310449 A1*  10/2017  Kim ...................... H04B 7/063
(Continued)

FOREIGN PATENT DOCUMENTS

AU    2016264412 A1    8/2017
CN      102104404 A    6/2011
(Continued)

OTHER PUBLICATIONS

European Search Report in European Application No. 18 89 0586 dated Nov. 6, 2020.

*Primary Examiner* — John D Blanton

(57) ABSTRACT

A method and an apparatus for obtaining downlink channel information are provided. The method includes, at least, receiving a first pilot signal sent by user equipment by using N first antenna ports, and determining, based on the received first pilot signal, a downlink channel gain matrix corresponding to the N first antenna ports, determining, based on the downlink channel gain matrix corresponding to the N first antenna ports, a first weight matrix corresponding to the N first antenna ports, and sending a second pilot signal to the user equipment. The method further includes receiving a precoding matrix indicator PMI fed back by the user equipment, determining a second weight matrix based on the PMI, and determining, based on the first weight matrix and the second weight matrix, downlink channel information that corresponds to the N first antenna ports and that corresponds to the M second antenna ports.

20 Claims, 7 Drawing Sheets

(56) References Cited

U.S. PATENT DOCUMENTS

| | | | |
|---|---|---|---|
| 2017/0331661 A1 | 11/2017 | Yang et al. | |
| 2018/0123659 A1* | 5/2018 | Qian | .................... H04B 7/0626 |
| 2019/0199553 A1* | 6/2019 | Park | .................... H04L 27/2607 |
| 2020/0187128 A1* | 6/2020 | Yao | .................... H04W 52/367 |
| 2020/0404593 A1* | 12/2020 | Yao | .................... H04W 52/245 |

FOREIGN PATENT DOCUMENTS

| | | | |
|---|---|---|---|
| CN | 103475401 A | 12/2013 | |
| CN | 104218982 A | 12/2014 | |
| CN | 105991171 A | 10/2016 | |
| CN | 106160820 A | 11/2016 | |
| CN | 107078993 B | 1/2020 | |
| EP | 2536231 A1 | 12/2012 | |
| EP | 3588794 A1 | 1/2020 | |
| WO | 2011050543 A1 | 5/2011 | |
| WO | 2017136749 A1 | 8/2017 | |

\* cited by examiner

METHOD AND APPARATUS FOR OBTAINING DOWNLINK CHANNEL INFORMATION

CROSS-REFERENCE TO RELATED APPLICATIONS

This application is a continuation of International Application No. PCT/CN2018/118998, filed on Dec. 3, 2018, which claims priority to Chinese Patent Application No. 201711386200.5, filed on Dec. 20, 2017. The disclosures of these applications are hereby incorporated by reference in their entireties.

TECHNICAL FIELD

This application relates to the field of communications technologies, and in particular, to a method and an apparatus for obtaining downlink channel information.

BACKGROUND

A multiple-input multiple-output (MIMO) technology means that a plurality of transmit antennas and a plurality of receive antennas are respectively used at a transmit end and a receive end, so that a signal is transmitted and received by using the plurality of antennas at the transmit end and the receive end, thereby improving communication quality. In a MIMO beamforming technology (MIMO-BF), a base station performs weighting on sent data based on downlink channel information, to form a narrow transmit beam, and aligns energy at a target user, thereby improving communication quality.

In a time division duplex (TDD) system, a same channel is used for uplink transmission and downlink transmission. Therefore, the base station can estimate the downlink channel information by measuring the uplink channel based on channel reciprocity. The channel reciprocity means that the uplink transmission and the downlink transmission use the same channel. When the time interval between the uplink transmission and the downlink transmission is sufficiently short, it may be considered that fading of the uplink channel is basically the same as that of the downlink channel.

However, because receiving and transmitting are unbalanced on a user equipment (UE) side, for example, the UE is usually a 2T4R (that is, the UE includes four antenna ports, uplink transmission is performed by using two of the four antenna ports and downlink receiving is performed by using the four antenna ports), a 4T8R (that is, the UE includes eight antenna ports, uplink transmission is performed by using four of the eight antenna ports and downlink receiving is performed by using the eight antenna ports), or the like. Currently, a common method for obtaining a downlink channel is as follows: Using the 2T4R UE as an example, the UE first sends a sounding reference signal (SRS) to the base station by using two antenna ports, so that the base station obtains, based on reciprocity between uplink and downlink channels, downlink channel information corresponding to the two antenna ports. Then, the UE sends the SRS to the base station by using the other two antenna ports, so that the base station obtains, based on the reciprocity between uplink and downlink channels, downlink channel information corresponding to the other two antenna ports. Because the UE needs a specific time interval between two times of sending the SRS, real-time performance is relatively poor, and accuracy of downlink channel information obtained by the base station is relatively low.

SUMMARY

This application provides a method and an apparatus for obtaining downlink channel information, to resolve a problem in the prior art that obtained downlink channel information is of low accuracy.

According to a first aspect, this application provides a method for obtaining downlink channel information. The method includes: receiving, by a network side device, a first pilot signal sent by user equipment by using N first antenna ports, and determining, based on the received first pilot signal, a downlink channel gain matrix corresponding to the N first antenna ports; determining, based on the downlink channel gain matrix corresponding to the N first antenna ports, a first weight matrix corresponding to the N first antenna ports, where the first weight matrix is used to represent downlink channel information corresponding to the N first antenna ports; sending, by the network side device, a second pilot signal to the user equipment, and receiving a precoding matrix indicator (PMI) fed back by the user equipment, where the PMI is determined by the user equipment based on a second pilot signal received by using P antenna ports; and the P antenna ports include M second antenna ports and at least one first antenna port, or the P antenna ports include the M second antenna ports; determining a second weight matrix based on the PMI, where the second weight matrix is used to represent downlink channel information corresponding to the P receiving ports; and determining, by the network side device based on the first weight matrix and the second weight matrix, downlink channel information that corresponds to the N first antenna ports and that corresponds to the M second antenna ports.

In an embodiment of this application, the network side device receives, in an uplink slot, a first pilot signal to measure an uplink channel, to obtain the downlink channel information; and sends, in a downlink slot, a second pilot signal to measure a downlink channel, and then obtains all downlink channel information by combining the downlink channel information obtained by using the first pilot signal and the downlink channel information measured by using the second pilot signal. As compared with a manner in the prior art in which the uplink channel information is obtained by continuously sending an SRS in two uplink slots to measure the uplink channel, because a time interval between the adjacent uplink slot and downlink slot is less than a time interval between two adjacent uplink slots, in an embodiment of this application, real-time performance is relatively good when the downlink channel information is obtained, and accuracy of obtaining the downlink channel information can be effectively improved.

In a possible implementation, the PMI is determined by the user equipment based on the second pilot signal received by using the M second antenna ports. The network side device concatenates the first weight matrix and the second weight matrix to obtain the downlink channel information that corresponds to the N first antenna ports and that corresponds to the M second antenna ports. The first weight matrix used to represent the downlink channel information corresponding to the N first antenna ports may be combined with the second weight matrix used to represent the downlink channel information corresponding to the M receive ports in the concatenating manner, to obtain the downlink channel information that corresponds to the N first antenna ports and that corresponds to the M second antenna ports.

In a possible implementation, the PMI is determined by the user equipment based on the second pilot signal received by using the M second antenna ports and the at least one first antenna port. The network side device may determine an m-column matrix in the second weight matrix, and concatenates the first weight matrix and the m-column matrix in the second weight matrix, to obtain the downlink channel information that corresponds to the N first antenna ports and that corresponds to the M second antenna ports. As compared with a manner in the prior art in which the user equipment sends, in a second uplink slot, an SRS pilot to the network side device by using the M second antenna ports to enable the network side device to obtain the downlink channel information corresponding to the M second antenna ports, in the foregoing implementation, downlink channel information corresponding to a plurality of antenna ports including the M second antenna ports may be obtained in a downlink slot having a shorter time interval with the first uplink slot, so that more accurate downlink channel information corresponding to the M second antenna ports can be obtained.

In a possible implementation, before the receiving, by the network side device, a first pilot signal sent by user equipment by using N first antenna ports, the network side device may receive the first pilot signal sent by the user equipment by using the M second antenna ports, and determine, based on the received first pilot signal, a downlink channel gain matrix corresponding to the M second antenna ports. The network side device then determines, based on the downlink channel gain matrix corresponding to the M second antenna ports, a third weight matrix corresponding to the M second antenna ports, where the third weight matrix is used to represent the downlink channel information corresponding to the M second antenna ports. Subsequently, the network side device determines the m-column matrix in the second weight matrix based on the third weight matrix, where a rank of the m-column matrix is equal to a rank of the third weight matrix. The third weight matrix is used to represent the downlink channel information corresponding to the M second antenna ports, and real-time performance of the second weight matrix is better than that of the third weight matrix. Therefore, the m-column matrix that is in the second weight matrix and that has a rank is equal to the rank of the third weight matrix can more accurately reflect a downlink channel status corresponding to the M second antenna ports.

In a possible implementation, the PMI is determined by the user equipment based on the second pilot signal received by using the M second antenna ports and the N first antenna ports. After the receiving, by the network side device, a first pilot signal sent by user equipment by using N first antenna ports, the network side device may receive the first pilot signal sent by the user equipment by using the M second antenna ports, and determine, based on the received first pilot signal, a downlink channel gain matrix corresponding to the M second antenna ports. The network side device then determines, based on the downlink channel gain matrix corresponding to the M second antenna ports, a fourth weight matrix corresponding to the M second antenna ports, where the fourth weight matrix is used to represent the downlink channel information corresponding to the M second antenna ports. Subsequently, the network side device concatenates the first weight matrix and the fourth weight matrix to obtain a fifth weight matrix, and adjusts the fifth weight matrix based on the second weight matrix, to obtain the downlink channel information that corresponds to the N first antenna ports and that corresponds to the M second antenna ports. Because the second weight matrix is obtained through measurement in one downlink slot, and the fifth weight matrix is obtained through measurement in two consecutive uplink slots, the second weight matrix has better real-time performance than the fifth weight matrix. In the foregoing implementation, that the fifth weight matrix is adjusted based on the second weight matrix with better real-time performance can improve real-time performance of obtaining the downlink channel information, so that accuracy of obtaining the downlink channel information can be effectively improved.

In a possible implementation, the network side device multiplies the second weight matrix by the fifth weight matrix, to adjust the fifth weight matrix based on the second weight matrix. In this way, a phase of a transmit beam corresponding to the fifth weight matrix may be corrected, so that a transmit beam formed based on the corrected fifth weight matrix is more accurate.

In a possible implementation, the network side device adjusts a size of a matrix element in the second weight matrix and/or the fifth weight matrix, and then multiplies the adjusted second weight matrix by the adjusted fifth weight matrix, to adjust the fifth weight matrix based on the second weight matrix. In this way, a phase and an amplitude of a transmit beam corresponding to the fifth weight matrix may be corrected, so that a transmit beam formed based on the corrected fifth weight matrix is more accurate.

In a possible implementation, the network side device determines an H*H-order orthogonal matrix of the downlink channel gain matrix corresponding to the N first antenna ports, and a rank of the downlink channel gain matrix corresponding to the N first antenna ports, where H is a quantity of receiving ports of the network side device; and then determines first n columns of the H*H-order orthogonal matrix as the first weight matrix, where n is equal to the rank of the downlink channel gain matrix corresponding to the N first antenna ports. In this way, the downlink channel gain matrix corresponding to the N first antenna ports may be normalized, so that the downlink channel gain matrix may be combined with the second weight matrix, to improve accuracy of obtaining the downlink channel information.

In a possible implementation, the network side device performs precoding weighting on the second pilot signal based on a preset weight matrix, and then sends the weighted second pilot signal to the user equipment. Subsequently, the network side device multiplies the preset weight matrix by the PMI to obtain the second weight matrix. In this way, the PMI may be normalized, and may be further combined with the first weight matrix to improve accuracy of obtaining the downlink channel information.

According to a second aspect, this application provides an apparatus for obtaining downlink channel information. The apparatus includes: a receiving module, configured to receive a first pilot signal sent by user equipment by using N first antenna ports; a determining module, configured to: determine, based on the first pilot signal received by the receiving module, a downlink channel gain matrix corresponding to the N first antenna ports, where N is an integer greater than 0, and determine, based on the downlink channel gain matrix corresponding to the N first antenna ports, a first weight matrix corresponding to the N first antenna ports, where the first weight matrix is used to represent downlink channel information corresponding to the N first antenna ports; and a sending module, configured to send a second pilot signal to the user equipment. The receiving module is further configured to receive a precoding matrix indicator PMI fed back by the user equipment, where the PMI is determined by the user equipment based on a second pilot signal received by using P antenna ports. The P antenna ports include M second antenna ports and at least one first antenna port, or the P antenna ports include M second antenna ports. The determining module is further configured to: determine a second weight matrix based on the PMI received by the receiving module, where the second weight matrix is used to represent downlink channel information corresponding to the P receiving ports; and determine, based on the first weight matrix and the second weight matrix, downlink channel information that corresponds to the N first antenna ports and that corresponds to the M second antenna ports.

In a possible implementation, the PMI is determined by the user equipment based on the second pilot signal received by using the M second antenna ports. When determining, based on the first weight matrix and the second weight matrix, the downlink channel information that corresponds to the N first antenna ports and that corresponds to the M second antenna ports, the determining module is specifically configured to concatenate the first weight matrix and the second weight matrix, to obtain the downlink channel information that corresponds to the N first antenna ports and that corresponds to the M second antenna ports.

In a possible implementation, the PMI is determined by the user equipment based on the second pilot signal received by using the M second antenna ports and the at least one first antenna port. When determining, based on the first weight matrix and the second weight matrix, the downlink channel information that corresponds to the N first antenna ports and that corresponds to the M second antenna ports, the determining module is specifically configured to: determine an m-column matrix in the second weight matrix, and concatenate the first weight matrix and the m-column matrix in the second weight matrix, to obtain the downlink channel information that corresponds to the N first antenna ports and that corresponds to the M second antenna ports, where m is an integer greater than 0 and less than a quantity of columns of the second weight matrix.

In a possible implementation, before the receiving a first pilot signal sent by user equipment by using N first antenna ports, the receiving module is further configured to receive the first pilot signal sent by the user equipment by using the M second antenna ports. The determining module is further configured to: determine, based on the first pilot signal received by the receiving module, a downlink channel gain matrix corresponding to the M second antenna ports, and determine, based on the downlink channel gain matrix corresponding to the M second antenna ports, a third weight matrix corresponding to the M second antenna ports. The third weight matrix is used to represent the downlink channel information corresponding to the M second antenna ports. When determining the m-column matrix in the second weight matrix, the determining module is specifically configured to determine the m-column matrix in the second weight matrix based on the third weight matrix, where a rank of the m-column matrix is equal to a rank of the third weight matrix.

In a possible implementation, the PMI is determined by the user equipment based on the second pilot signal received by using the M second antenna ports and the N first antenna ports. After the receiving a first pilot signal sent by user equipment by using N first antenna ports, the receiving module is further configured to receive the first pilot signal sent by the user equipment by using the M second antenna ports. The determining module is further configured to: determine, based on the first pilot signal received by the receiving module, a downlink channel gain matrix corresponding to the M second antenna ports, and determine, based on the downlink channel gain matrix corresponding to the M second antenna ports, a fourth weight matrix corresponding to the M second antenna ports. The fourth weight matrix is used to represent the downlink channel information corresponding to the M second antenna ports. When determining, based on the first weight matrix and the second weight matrix, the downlink channel information that corresponds to the N first antenna ports and that corresponds to the M second antenna ports, the determining module is specifically configured to: concatenate the first weight matrix and the fourth weight matrix to obtain a fifth weight matrix, and adjust the fifth weight matrix based on the second weight matrix to obtain the downlink channel information that corresponds to the N first antenna ports and that corresponds to the M second antenna ports.

In a possible implementation, when adjusting the fifth weight matrix based on the second weight matrix, the determining module is specifically configured to multiply the second weight matrix by the fifth weight matrix.

In a possible implementation, when adjusting the fifth weight matrix based on the second weight matrix, the determining module is specifically configured to: adjust a size of a matrix element in the second weight matrix and/or the fifth weight matrix and multiply the adjusted second weight matrix by the adjusted fifth weight matrix.

In a possible implementation, when determining, based on the downlink channel gain matrix corresponding to the N first antenna ports, the first weight matrix corresponding to the N first antenna ports, the determining module is specifically configured to: determine an H*H-order orthogonal matrix of the downlink channel gain matrix corresponding to the N first antenna ports, and a rank of the downlink channel gain matrix corresponding to the N first antenna ports. H can include a quantity of receiving ports of the network side device. Then, the determining module determines first n columns of the H*H-order orthogonal matrix as the first weight matrix. It should be appreciated that n can be equal to the rank of the downlink channel gain matrix corresponding to the N first antenna ports.

In a possible implementation, the apparatus further includes an encoding module, configured to perform precoding weighting on the second pilot signal based on a preset weight matrix. When sending the second pilot signal to the user equipment, the sending module is specifically configured to send the weighted second pilot signal to the user equipment. When determining the second weight matrix based on the PMI, the determining module is specifically configured to multiply the preset weight matrix by the PMI to obtain the second weight matrix.

According to a third aspect, this application provides an apparatus for obtaining downlink channel information, including a transceiver, a memory, and a processor. The memory is configured to store program code that can be executed by the processor. The transceiver is configured to receive and send data. The processor is configured to execute the program code stored in the memory, and is configured to perform the method according to the first aspect or any one of the implementations of the first aspect.

According to a fourth aspect, this application further provides a computer-readable storage medium, configured to store a computer software instruction used to perform the first aspect and any one of the implemented functions of the first aspect, and the computer software instruction includes a program configured to perform the first aspect or any one of the implementations of the first aspect.

According to a fifth aspect, an embodiment of this application provides a computer program product including an instruction. When the computer program product is run on a computer, the computer is enabled to perform the method according to the first aspect or any one of the implementations of the first aspect.

According to a sixth aspect, an embodiment of this application provides a chip. The chip is connected to a memory, and is configured to read and execute a software program stored in the memory, to implement the method according to the first aspect or any one of the implementations of the first aspect.

DESCRIPTION OF EMBODIMENTS

To make the objectives, technical solutions, and advantages of this application clearer, the following further describes this application in detail with reference to the accompanying drawings.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may learn that: With the evolution of the network architecture and the emergence of new service scenarios, the technical solutions provided in the embodiments of this application are also applicable to similar technical problems.

Figure 1A:
FIG. 1A is an example schematic architectural diagram of a SISO system.
Figure 1B:
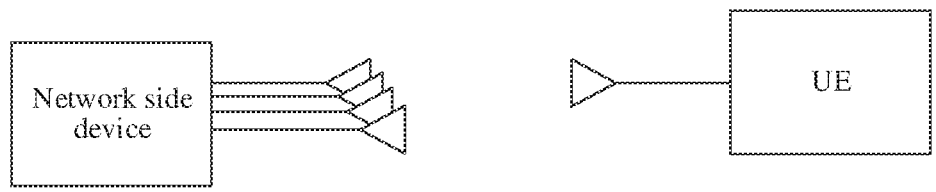
FIG. 1B is an example schematic architectural diagram of a MISO system.
Figure 1C:
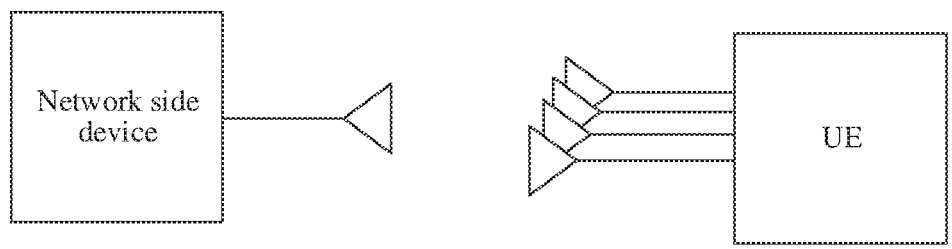
FIG. 1C is an example schematic architectural diagram of a SIMO system.
Figure 1D:
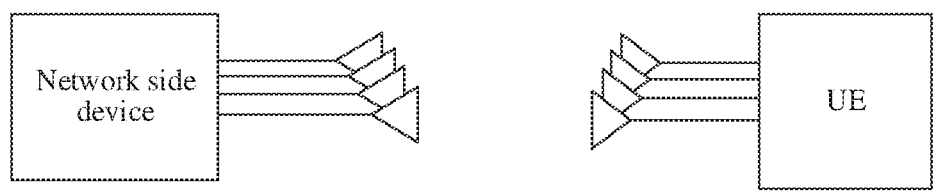
FIG. 1D is an example schematic architectural diagram of a MIMO system.

A communications system may be classified into a single-input single-output (SISO) system, a multiple-input single-output (MISO) system, a single-input multiple-output (SIMO) system, or a multiple-input multiple-output (MIMO) system. Both a network side device and user equipment in the SISO system include one antenna, as shown in FIG. 1A. In the MISO system, the network side device includes a plurality of antennas, and the user equipment includes one antenna, as shown in FIG. 1B. In the SIMO system, the network side device includes one antenna, and the user equipment includes a plurality of antennas, as shown in FIG. 1C. In the MIMO system, the network side device includes a plurality of antennas, and the user equipment includes a plurality of antennas, as shown in FIG. 1D. In one non-limiting example, certain embodiments of this application may be applied to the MIMO system shown in FIG. 1D. The MIMO system in the embodiments of this application may be various communications systems, for example, may be a long term evolution (LTE) system, may be a fifth-generation (5G) communications system, or may be a hybrid architecture of the LTE and the 5G.

The network side device may be a common base station (for example, a NodeB or an eNB), a new radio controller (NR controller), a gNode B (gNB) in a 5G system, a centralized network element (centralized unit), a new radio base station, a radio remote unit a micro base station, a distributed network element (distributed unit), a transmission reception point (TRP), a transmission point (TP), or any other radio access device. This is not limited in the embodiments of this application.

The user equipment (UE), namely, a terminal device, is a device providing voice and/or data connectivity to a user, for example, a handheld device or a vehicle-mounted device having a wireless connection function. A common terminal includes, for example, a mobile phone, a tablet computer, a notebook computer, a palmtop computer, a mobile internet device (MID), and a wearable device such as a smartwatch, a smart band, or a pedometer.

In the MIMO system, the network side device (for example, a base station) may send data to the UE by using the MIMO beamforming (MIMO-BF) technology. In the MIMO-BF, the network side device performs weighting on the sent data based on downlink channel information, to form a narrow transmit beam, and aligns energy at target UE, thereby improving communication quality.

The MIMO system may be classified into a frequency division duplex (FDD) system or a time division duplex (TDD) system. In the FDD system, two channels that are independent of each other are respectively used for uplink transmission and downlink transmission. In the TDD system, a same channel is used for the uplink transmission and the downlink transmission. Therefore, in the TDD system, the network side device can estimate the downlink channel information by measuring an uplink channel based on channel reciprocity. The channel reciprocity means that the same channel is used for the uplink transmission and the downlink transmission. When the time interval between the uplink transmission and the downlink transmission is sufficiently short, it may be considered that fading of the uplink channel is basically the same as that of the downlink channel.

However, receiving and transmitting of the UE are usually unbalanced, for example, the UE is usually a 2T4R (that is, the UE includes four antenna ports, uplink transmission is performed by using two of the four antenna ports and downlink receiving is performed by using the four antenna ports), a 4T8R (that is, the UE includes eight antenna ports, uplink transmission is performed by using four of the eight antenna ports and downlink receiving is performed by using the eight antenna ports), or the like. Therefore, in the TDD system, in a manner in which the network side device estimates the downlink channel information by measuring the uplink channel, only downlink channel information corresponding to some antenna ports included in the UE can be obtained. To obtain downlink channel information corresponding to all antennas included in the UE, currently, a common method for obtaining a downlink channel information is as follows. In an existing solution 1, using the 2T4R UE as an example, four antenna ports of the UE are respectively an antenna port 0 to an antenna port 3. The UE sends a sounding reference signal (SRS) to the base station by using the antenna port 0 and the antenna port 2 in one uplink slot, so that the base station determines uplink channel information that corresponds to the antenna port 0 and that corresponds to the antenna port 2 after receiving the SRS from the antenna port 0 and the antenna port 2. Then, the UE obtains downlink channel information that corresponds to the antenna port 0 and that corresponds to the antenna port 2 based on reciprocity between uplink and downlink channels. Then, the UE sends the SRS to the base station by using the antenna port 1 and the antenna port 3 in a next uplink slot, so that the base station determines uplink channel information that corresponds to the antenna port 1 and that corresponds to the antenna port 3 after receiving the SRS from the antenna port 1 and the antenna port 3. Then, the UE obtains downlink channel information that corresponds to the antenna port 1 and that corresponds to the antenna port 3 based on the reciprocity between uplink and downlink channels. Because the UE needs a specific time interval between two times of sending the SRS (in other words, there is a specific time interval between two consecutive uplink slots), real-time performance of the downlink channel information that corresponds to the antenna port 0 and that corresponds to the antenna port 2 and that is first obtained is relatively poor, and accuracy of the downlink channel information obtained by the base station is relatively low.

In addition to the existing solution 1, currently, a common method for obtaining the downlink channel includes an existing solution 2. Using the 2T4R UE as an example, the network side device sends a channel state measurement pilot (CSI reference signals, CSI-RS) to the UE, after receiving the CSI-RS by using the four antenna ports, the UE feeds back a precoding matrix indicator (PMI) to the network side device, so that the network side device obtains the downlink channel information based on the PMI fed back by the UE. However, a quantity of PMIs specified in the 3rd generation partnership project (3GPP) protocol is relatively limited. Therefore, the downlink channel information obtained by the network side device based on the PMI fed back by the UE can only approximate to an actual downlink channel status, but cannot accurately reflect the actual downlink channel status, and accuracy is relatively low.

Based on this, this application provides, at least, a method and an apparatus for obtaining downlink channel information, to resolve a problem in the prior art that obtained downlink channel information is of low accuracy. Because principles of the method and the apparatus for resolving a problem are similar, mutual reference may be made between implementations of the apparatus and the method.

To make the embodiments of this application easier to be understood, the following first describes some descriptions in the embodiments of this application. These descriptions should not be considered as a limitation on the scope claimed in this application.

An uplink channel gain matrix includes a plurality of uplink channel gains, where a quantity of rows of the uplink channel gain matrix represents a quantity of antenna ports used by the network side device to receive data, and a quantity of columns of the uplink channel gain matrix represents a quantity of antenna ports used by the UE to send data. Therefore, a matrix element $h_{i,j}$ in an $i^{th}$ row and a $j^{th}$ column in the uplink channel gain matrix represents a channel gain of an uplink channel between an $i^{th}$ antenna port of the network side device and a $j^{th}$ antenna port of the UE, and $h_{i,j}$ may meet the following formula requirement:

$$y_{i,j}=h_{i,j} \times s_{i,j}+n$$

$y_{i,j}$ represents a received signal that is from the $j^{th}$ antenna port of the UE and that is received by the $i^{th}$ antenna port of the network side device, $h_{i,j}$ represents the channel gain of the uplink channel between the $i^{th}$ antenna port of the network side device and the $j^{th}$ antenna port of the UE, and $s_{i,j}$ represents a transmitted signal sent by the UE by using the $i^{th}$ antenna port, and n indicates noise of the network side device.

A downlink channel gain matrix includes a plurality of downlink channel gains, where a quantity of rows of the downlink channel gain matrix represents a quantity of antenna ports used by the UE to receive data, and a quantity of columns of the downlink channel gain matrix represents a quantity of antenna ports used by the network side device to send data. Therefore, a matrix element in an $r^{th}$ row and a $k^{th}$ column in the downlink channel gain matrix represents a channel gain of a downlink channel between an $r^{th}$ antenna port of the UE and a $k^{th}$ antenna port of the network side device.

The channel reciprocity can mean that a same channel is used for uplink transmission and downlink transmission. When a time interval between the uplink transmission and the downlink transmission is sufficiently short, it may be considered that fading of the uplink channel is basically the same as that of the downlink channel. Therefore, the channel gain of the uplink channel between the $i^{th}$ antenna port of the network side device and the $j^{th}$ antenna port of the UE is the same as the channel gain of the downlink channel between the $j^{th}$ antenna port of the UE and the $i^{th}$ antenna port of the network side device.

Singular value decomposition (SVD): SVD is performed on a matrix M of an order a*b. In other words, the matrix M is decomposed into a product of three matrices:

$$SVD(M)=USV;$$

U is an a*a-order orthogonal matrix of the matrix M, S is a diagonal matrix of the matrix M, and V is a b*b-order orthogonal matrix of the matrix M.

Rank: a maximum order of a non-zero subdeterminant of the matrix is a rank of the matrix.

"Multiple" refers to two or more.

In addition, it should be understood that, in descriptions of this application, terms such as "first" and "second" are merely used for purposes of distinguishing descriptions and are neither intended to indicate or imply relative importance nor intended to indicate or imply a sequence.

The following further describes in detail the embodiments of this application with reference to accompanying drawings.

Figure 2:
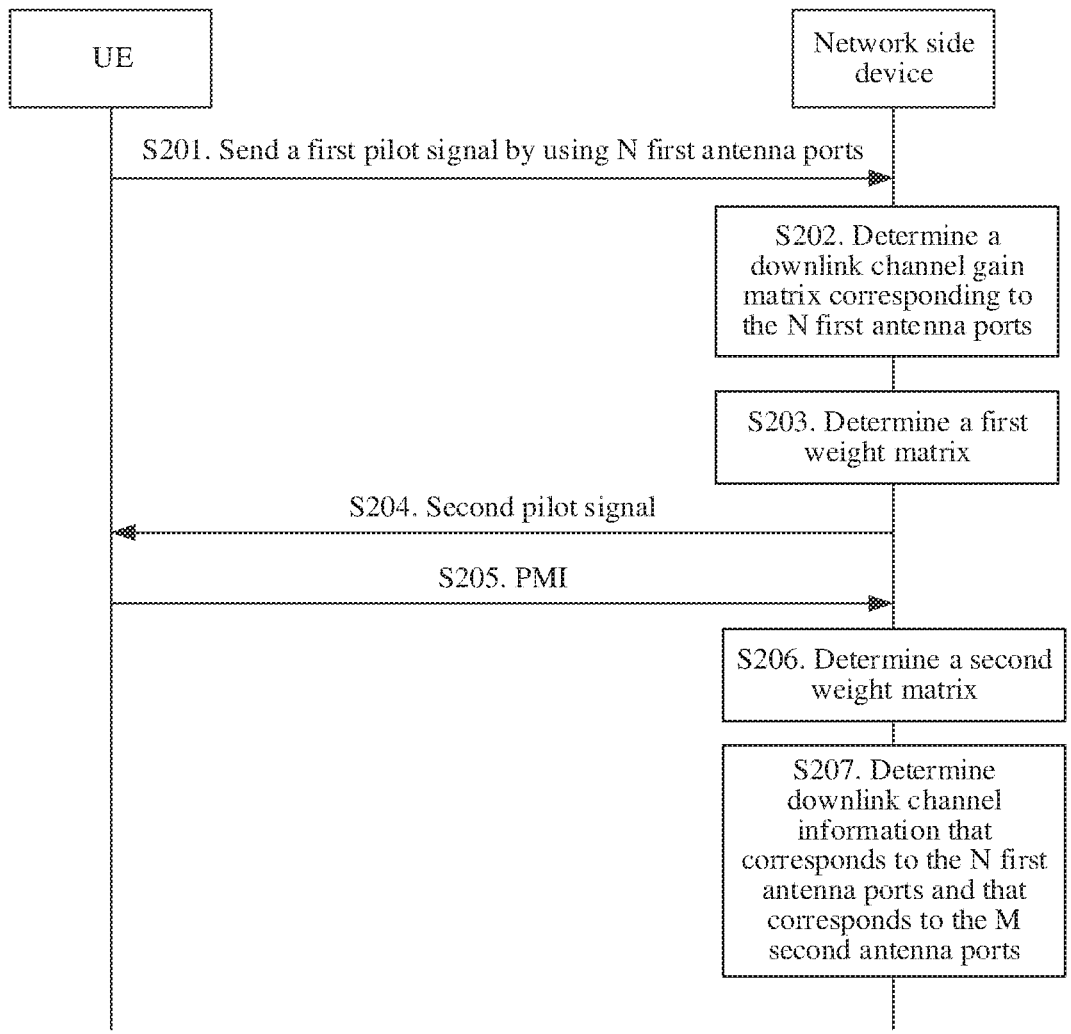
FIG. 2 is an example schematic flowchart of a method for obtaining downlink channel information.

FIG. 2 shows a method for obtaining downlink channel information according to an embodiment of this application. The method may be applied to a TDD system in a MIMO system, and the method may specifically include the following steps.

S201. UE sends a first pilot signal to a network side device (for example, a base station) by using N first antenna ports in a first uplink slot. The first uplink slot may be any uplink slot where N can be an integer greater than 0. The first antenna port may be an antenna port that is used to send data in the first uplink slot and that is in the antenna ports included in the UE. If the UE is a 2T4R, the UE may send the first pilot signal to the network side device (for example, the base station) by using any two antenna ports in the first uplink slot. If the UE is the 4T8R, the UE may send the first pilot signal to the network side device (for example, the base station) by using any four antenna ports in the first uplink slot. The first pilot signal may be an SRS.

S202. The network side device determines, based on the first pilot signal from the N first antenna ports, a downlink channel gain matrix corresponding to the N first antenna ports.

In a possible implementation, the network side device may determine, based on the first pilot signal from the N first antenna ports, an uplink channel gain matrix $H_{UL}$ (H*N-order matrix) corresponding to the N first antenna ports, and then determine, based on reciprocity between uplink and downlink channels, a downlink channel gain matrix $H_{DL}$ (N*H-order matrix) corresponding to the N first antenna ports. H can include a quantity of antenna ports used to receive and send data in the network side device.

S203. The network side device determines, based on the downlink channel gain matrix corresponding to the N first antenna ports, a first weight matrix $V_1$ corresponding to the N first antenna ports. The first weight matrix $V_1$ is used to represent downlink channel information corresponding to the N first antenna ports.

The first weight matrix $V_1$ may be determined in the following manner. The network side device determines an H*H-order orthogonal matrix of $H_{DL}$ and a rank of $H_{DL}$, and determines first n columns of the H*H-order orthogonal matrix as the first weight matrix $V_1$. It should be appreciated that n can be equal to the rank of $H_{DL}$. The network side device may determine the H*H-order orthogonal matrix of $H_{DL}$ and the rank of $H_{DL}$ in a manner of performing the SVD on $H_{DL}$, which is as follows:

$$SVD(H_{DL}) = U_{HDL} S_{HDL} V_{HDL};$$

$V_{HDL}$ represents the H*H-order orthogonal matrix of $H_{DL}$, $S_{HDL}$ represents a diagonal matrix of $H_{DL}$, and a quantity of non-zero rows in $S_{HDL}$ is the rank of $H_{DL}$.

S204. The network side device sends a second pilot signal to the UE in a first downlink slot. The first downlink slot may be before the first uplink slot, or may be after the first uplink slot. The second pilot signal may be a CSI-RS, may be a cell-specific pilot (cell-specific RS, CRS), or the like. This is not specifically limited in this embodiment of this application.

In a possible implementation, when sending the second pilot signal to the UE, the network side device may first perform precoding weighting on the second pilot signal based on a preset weight matrix V, and then send the weighted second pilot signal to the UE. A quantity of rows of the preset weight matrix is equal to H, and a quantity of columns of the preset weight matrix is equal to a quantity of antenna ports that are included in the UE and that are used to receive data.

S205. The UE feeds back a PMI to the network side device. The PMI is determined by the UE based on the second pilot signal received by P antenna ports. The P antenna ports include M second antenna ports and at least one first antenna port, or the P antenna ports include the M second antenna ports. P and M are integers greater than 0, and P is greater than or equal to M. The second antenna port may be an antenna port that is not used to send data in the first uplink slot and that is in the antenna ports included in the UE, that is, an antenna port other than the N first antenna ports in the antenna ports included in the UE.

S206. The network side device determines a second weight matrix $V_2$ based on the PMI. The second weight matrix $V_2$ is used to represent downlink channel information corresponding to the P receiving ports.

In a possible implementation, the network side device may determine the second weight matrix $V_2$ by multiplying the preset weight matrix by the PMI.

S207. The network side device determines, based on the first weight matrix $V_1$ and the second weight matrix $V_2$, downlink channel information that corresponds to the N first antenna ports and that corresponds to the M second antenna ports.

In an embodiment of this application, the network side device receives, in an uplink slot, a first pilot signal to measure an uplink channel, to obtain the downlink channel information; and sends, in a downlink slot, a second pilot signal to measure a downlink channel, and then obtains all downlink channel information by combining the downlink channel information obtained by using the first pilot signal and the downlink channel information measured by using the second pilot signal. As compared with a manner in the prior art in which the uplink channel information is obtained by continuously sending an SRS in two uplink slots to measure the uplink channel, because a time interval between the adjacent uplink slot and downlink slot is less than a time interval between two adjacent uplink slots, in an embodiment of this application, real-time performance is relatively good when the downlink channel information is obtained, and accuracy of obtaining the downlink channel information can be effectively improved.

In a possible implementation, after the network side device sends the second pilot signal to the UE in the first downlink slot, the UE may receive the second pilot signal by using the M second antenna ports. In this case, the preset weight matrix V is an H*M-order matrix.

Based on the foregoing implementation, when determining the PMI, the UE may determine the PMI based on the second pilot signal received by the M second antenna ports.

Based on the foregoing manner of determining the PMI, when determining the second weight matrix $V_2$, the network side device may determine the second weight matrix $V_2$ by multiplying the H*M order preset weight matrix by the determined PMI. The second weight matrix $V_2$ may be as follows:

$$V_2 = V \times PMI = \begin{bmatrix} v(1, N+1) & \ldots & v(1, N+M) \\ \ldots & \ldots & \ldots \\ v(H, N+1) & \ldots & v(H, N+M) \end{bmatrix};$$

Based on the manner of determining the second weight matrix $V_2$, when determining downlink channel information $V_{DL}$ that corresponds to the N first antenna ports and that corresponds to the M second antenna ports, the network side device may implement the determining in a manner of concatenating the first weight matrix $V_1$ and the second weight matrix $V_2$. For example, the first weight matrix $V_1$ and the second weight matrix $V_2$ are respectively as follows:

$$V_1 = \begin{bmatrix} v(1, 1) & \ldots & v(1, N) \\ \ldots & \ldots & \ldots \\ v(H, 1) & \ldots & v(H, N) \end{bmatrix};$$

$$V_2 = \begin{bmatrix} v(1, N+1) & \ldots & v(1, N+M) \\ \ldots & \ldots & \ldots \\ v(H, N+1) & \ldots & v(H, N+M) \end{bmatrix};$$

The downlink channel information $V_{DL}$ that corresponds to the N first antenna ports and that corresponds to the M second antenna ports is as follows:

$$V_{DL} = \begin{bmatrix} v(1,1) & \ldots & v(1,N) & v(1,N+1) & \ldots & v(1,N+M) \\ \ldots & \ldots & \ldots & \ldots & \ldots & \ldots \\ v(H,1) & \ldots & v(H,N) & v(H,N+1) & \ldots & v(H,N+M) \end{bmatrix}.$$

In another possible implementation, after the network side device sends the second pilot signal to the UE in the first downlink slot, the UE may further receive the second pilot signal by using the M second antenna ports and the at least one first antenna port. In this case, the preset weight matrix V is an H*(M+x)-order matrix, and x is a quantity of the at least one first antenna port.

Based on the another implementation, the UE may determine the PMI in the following two manners, but the manners are not limited thereto.

In a first implementation, the UE determines the PMI based on the second pilot signal received by the M second antenna ports.

Based on the first implementation, the network side device may determine the second weight matrix $V_2$ in the following manner. The network side device first determines an M-column matrix in the H*(M+x)-order preset weight matrix, and multiplies the M-column matrix by the determined PMI to determine the second weight matrix $V_2$. The M-column matrix may include any M columns of matrix elements in the second weight matrix $V_2$. The second weight matrix $V_2$ may be as follows:

$V2 = (M \text{ columns of matrix in } V) \times \text{PMI}.$

Based on the first implementation, when determining the downlink channel information $V_{DL}$ that corresponds to the N first antenna ports and that corresponds to the M second antenna ports, the network side device may implement the determining in a manner of concatenating the first weight matrix $V_1$ and the second weight matrix $V_2$. Herein, a method similar to the foregoing method in which the $V_1$ and the $V_2$ are concatenated to obtain the $V_{DL}$ may be used.

In a second implementation, the UE may determine the PMI based on the second pilot signal received by the M second antenna ports and the at least one first antenna port.

Based on the second implementation, when determining the second weight matrix $V_2$, the network side device may implement the determining in a manner of multiplying the H*(M+x)-order preset weight matrix by the PMI. The second weight matrix $V_2$ may be as follows:

$$V_2 = V \times PMI = \begin{bmatrix} v(1,N+1) & \ldots & v(1,N+M+x) \\ \ldots & \ldots & \ldots \\ v(H,N+1) & \ldots & v(H,N+M+x) \end{bmatrix}.$$

Based on the second implementation, the downlink channel information $V_{DL}$ that corresponds to the N first antenna ports and that corresponds to the M second antenna ports may be determined by the network side device in the following manner. The network side device first determines the m-column matrix in the second weight matrix $V_2$, and then concatenates the first weight matrix $V_1$ and the m-column matrix in the second weight matrix $V_2$. It should be appreciated that m can be an integer greater than 0 and less than a quantity of columns of the second weight matrix. For example, the first weight matrix $V_1$ and the second weight matrix $V_2$ are respectively as follows:

$$V_1 = \begin{bmatrix} v(1,1) & \ldots & v(1,N) \\ \ldots & \ldots & \ldots \\ v(H,1) & \ldots & v(H,N) \end{bmatrix};$$

$$V_2 = \begin{bmatrix} v(1,N+1) & \ldots & v(1,N+M+x) \\ \ldots & \ldots & \ldots \\ v(H,N+1) & \ldots & v(H,N+M+x) \end{bmatrix};$$

The downlink channel information $V_{DL}$ that corresponds to the N first antenna ports and that corresponds to the M second antenna ports is as follows:

$V_{DL} = [V_1, \text{ and } m - \text{column matrix in } V_2] =$ $$\begin{bmatrix} v(1,1) & \ldots & v(1,N) & v(1,N+1) & \ldots & v(1,N+M) \\ \ldots & \ldots & \ldots & \ldots & \ldots & \ldots \\ v(H,1) & \ldots & v(H,N) & v(H,N+1) & \ldots & v(H,N+M) \end{bmatrix};$$

the m-column matrix may include any M columns of matrix elements in the second weight matrix $V_2$. Alternatively, the m-column matrix may include an m-column matrix element in the second weight matrix $V_2$, and a rank of the m-column matrix element is equal to a rank of a third weight matrix $V_3$. The third weight matrix $V_3$ is used to represent the downlink channel information corresponding to the M second antenna ports.

The network side device may determine the third weight matrix $V_3$ in the following manner. The UE sends the first pilot signal to the network side device by using the M second antenna ports in a second uplink slot. The second uplink slot may be before the first uplink slot. Then, the network side device determines, based on the received first pilot signal from the M second antenna ports, a downlink channel gain matrix corresponding to the M second antenna ports, and determines, based on the downlink channel gain matrix corresponding to the M second antenna ports, the third weight matrix $V_3$ corresponding to the M second antenna ports. The network side device may determine the downlink channel gain matrix corresponding to the M second antenna ports by using a method similar to the method for determining the downlink channel gain matrix corresponding to the N first antenna ports. The network side device may also determine the third weight matrix by using a method similar to the method for determining the first weight matrix.

Based on the second implementation, when the quantity of the at least one first antenna port is N, that is, when the UE receives the second pilot signal by using the M second antenna ports and the N first antenna ports, and determines the PMI based on the second pilot signal received by using the M second antenna ports and the N first antenna ports, the network side device may further determine the downlink channel information $V_{DL}$ that corresponds to the N first antenna ports and that corresponds to the M second antenna ports in the following manner.

The network side device concatenates the first weight matrix $V_1$ and the third weight matrix $V_3$ to obtain a fourth weight matrix $V_4$, and adjusts the fourth weight matrix $V_4$ based on the second weight matrix $V_2$, to obtain the downlink channel information $V_{DL}$ that corresponds to the N first antenna ports and that corresponds to the M second antenna ports. In this manner, the second uplink slot may be before the first uplink slot, or may be after the first uplink slot.

The network side device may adjust the fourth weight matrix based on the second weight matrix in the following manners, but the manners are not limited thereto.

Manner 1. The network side device multiplies the second weight matrix $V_2$ by the fourth weight matrix $V_4$. The downlink channel information $V_{DL}$ that corresponds to the N first antenna ports and that corresponds to the M second antenna ports is as follows:

$$V_{DL} = V_2 \times V_4.$$

Manner 2. The network side device adjusts a size of a matrix element in the second weight matrix $V_2$ and/or the fourth weight matrix $V_4$, and then multiplies the adjusted second weight matrix $V_2'$ by the adjusted fourth weight matrix $V_4'$. The downlink channel information $V_{DL}$ that corresponds to the N first antenna ports and that corresponds to the M second antenna ports is as follows:

$$V_{DL} = V_2' \times V_4'.$$

Figure 3:
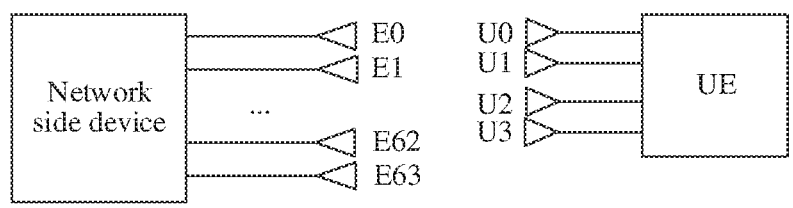
FIG. 3 is an example schematic architectural diagram of a MIMO system.

To better understand this embodiment of this application, for example, in the MIMO system shown in FIG. 3, the first pilot signal is an SRS, and the second pilot signal is a CIS-RS. The MIMO system includes one 2T4R UE and one network side device. The UE includes four antenna ports 0, which are respectively $U_0$ to $U_3$. The N first antenna ports are $U_0$ and $U_2$, the M second antenna ports are $U_1$ and $U_3$. The network side device includes 64 antenna ports used to receive and send data, and for example, the 64 antenna ports are respectively $E_0$ to $E_{63}$. The following describes in detail the method for obtaining downlink channel information with reference to a specific application scenario. FIG. 3 is merely a schematic diagram, and does not specifically limit a communications system to which the embodiments of this application are applied.

Figure 4:
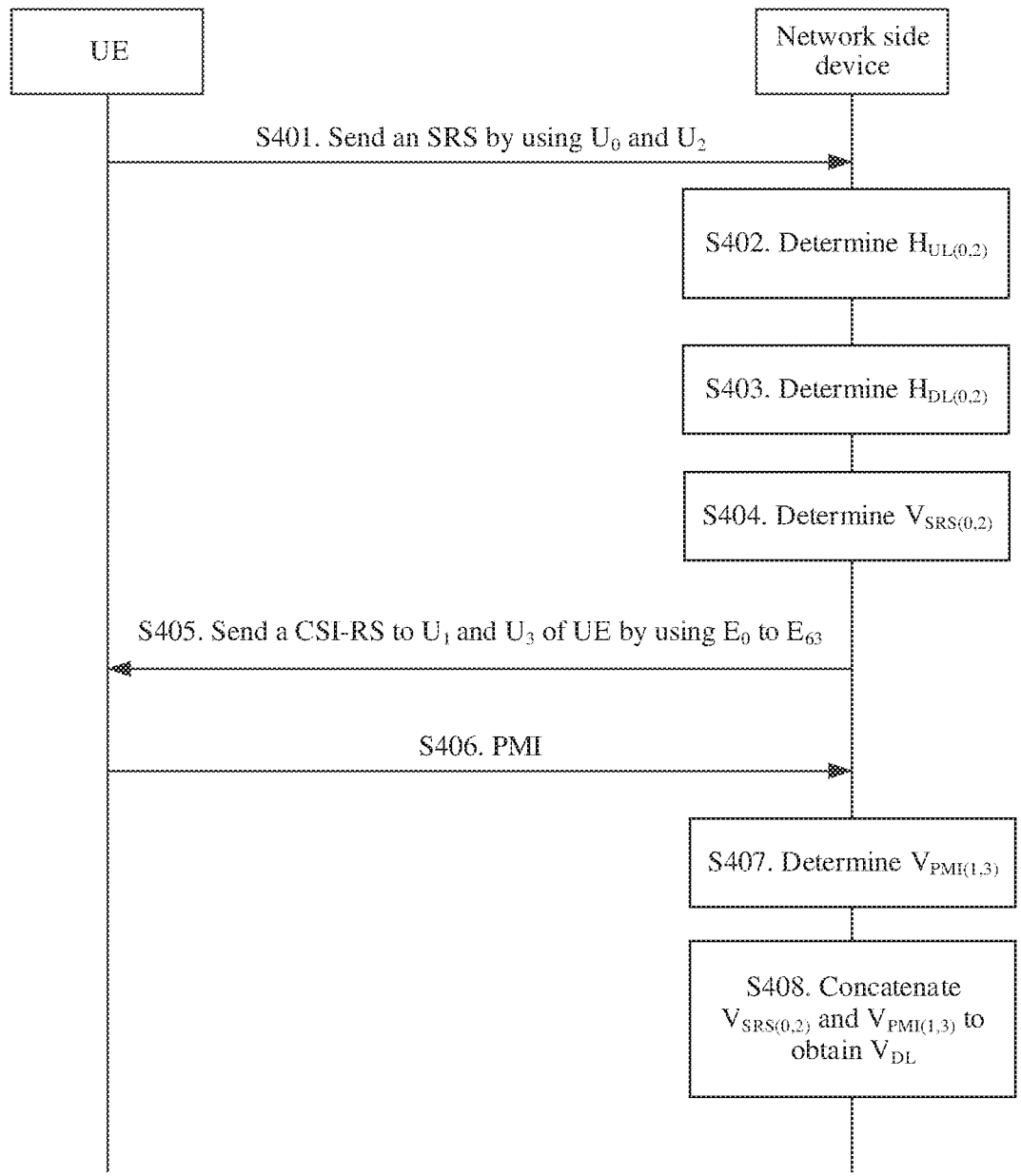
FIG. 4 is an example schematic flowchart of a method for obtaining downlink channel information.

FIG. 4 shows a process of obtaining downlink channel information.

S401. UE sends an SRS to a network side device by using $U_0$ and $U_2$.

S402. The network side device determines, based on the SRS received from $U_0$ and $U_2$ by $E_0$ to $E_{63}$, an uplink channel gain matrix $H_{UL(0, 2)}$ that corresponds to $U_0$ and that corresponds to $U_2$, where $H_{UL(0, 2)}$ is as follows:

$$H_{UL(0,2)} = \begin{bmatrix} h_{E_0,U_0} & h_{E_0,U_2} \\ h_{E_1,U_0} & h_{E_1,U_2} \\ \ldots & \ldots \\ h_{E_{62},U_0} & h_{E_{62},U_2} \\ h_{E_{63},U_0} & h_{E_{63},U_2} \end{bmatrix}$$

S403. The network side device determines, based on reciprocity between uplink and downlink channels, the downlink channel gain matrix $H_{DL(0, 2)}$ that corresponds to $U_0$ and that corresponds to $U_2$, where $H_{DL(0, 2)}$ is as follows:

$$H_{DL(0,2)} = \begin{bmatrix} h_{E_0,U_0} & h_{E_1,U_0} & \ldots & h_{E_{62},U_0} & h_{E_{63},U_0} \\ h_{E_0,U_2} & h_{E_1,U_2} & \ldots & h_{E_{62},U_2} & h_{E_{63},U_2} \end{bmatrix}$$

S404. The network side device determines, based on $H_{DL(0, 2)}$, a corresponding weight matrix $V_{SRS(0,2)}$.

Specifically, the network side device may perform SVD on $H_{DL(0, 2)}$ (2*64-order), and $SVD(H_{DL(0, 2)}) = U_{(0,2)} S_{(0,2)} V_{(0,2)}$. $U_{(0,2)}$ is a 2*2-order orthogonal matrix of $H_{DL(0, 2)}$, $V_{(0,2)}$ is a 64*64-order orthogonal matrix of $H_{DL(0, 2)}$, and $S_{(0,2)}$ is a diagonal matrix of $H_{DL(0, 2)}$. A quantity of non-zero rows in the network side device $S_{(0,2)}$ is a rank of $H_{DL(0, 2)}$. It is assumed that the rank of $H_{DL(0, 2)}$ is 2, and then first two columns in $V_{(0,2)}$ are used as $V_{SRS(0,2)}$(64*2-order).

S405. The network side device sends a CSI-RS to $U_1$ and $U_3$ of the UE by using $E_0$ to $E_{63}$.

Specifically, the network side device performs precoding weighting on the CSI-RS based on a preset weight matrix V(64*2-order), and sends the weighted CSI-RS to $U_1$ and $U_3$ of the UE by using $E_0$ to $E_{63}$.

There is no strict sequence between step S405 and step S401. Step S405 may be performed before step S401, or may be performed after step S401. This is not specifically limited in this embodiment of this application.

S406. The UE feeds back a PMI to the network side device based on the CSI-RS received by $U_1$ and $U_3$.

S407. The network side device determines a corresponding weight matrix $V_{PMI(1,3)}$ based on the PMI.

Specifically, the network side device multiplies V(64*2-order) by the PMI that is fed back, to obtain $V_{PMI(1,3)}$(64*2-order).

S408. The network side device concatenates $V_{SRS(0,2)}$ and $V_{PMI(1,3)}$, to obtain downlink channel information $V_{DL}$ corresponding to $U_0$ to $U_3$.

Figure 5:
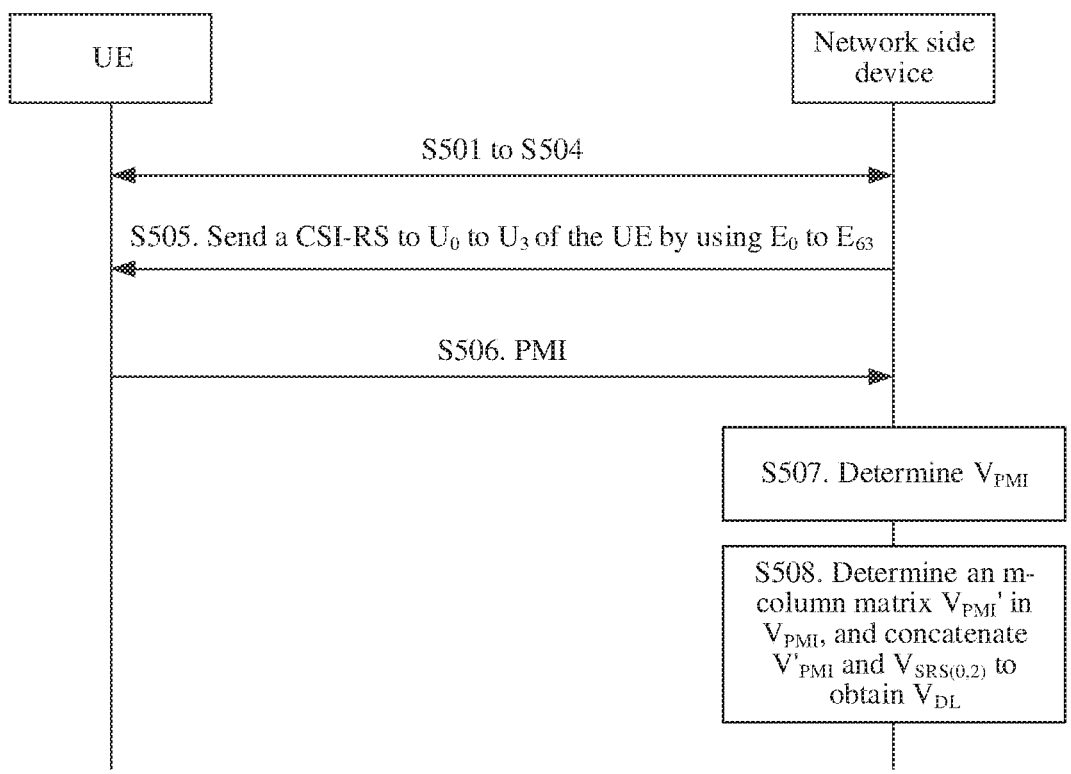
FIG. 5 is an example schematic flowchart of a method for obtaining downlink channel information.

FIG. 5 shows another process of obtaining downlink channel information.

For S501 to S504, can refer to step S401 to step S404 shown in FIG. 4.

S505. The network side device sends the CSI-RS to $U_0$ to $U_3$ of the UE by using $E_0$ to $E_{63}$.

Specifically, the network side device performs precoding weighting on the CSI-RS based on a preset weight matrix V(64*4-order), and sends the weighted CSI-RS to $U_0$ to $U_3$ of the UE by using $E_0$ to $E_{63}$.

There is no strict sequence between step S505 and step S501. Step S505 may be performed before step S501, or may be performed after step S501. This is not specifically limited in this embodiment of this application.

S506. The UE feeds back the PMI to the network side device based on the CSI-RS received by $U_0$ to $U_3$.

S507. The network side device determines a corresponding weight matrix $V_{PMI}$ based on the PMI.

Specifically, the network side device multiplies the V(64*4-order) by the PMI that is fed back, to obtain $V_{PMI}$(64*4-order).

S508. The network side device determines an m-column matrix $V_{PMI}'$ in $V_{PMI}$, and concatenates $V_{PMI}'$ and $V_{SRS(0,2)}$ to obtain $V_{DL}$.

Figure 6:
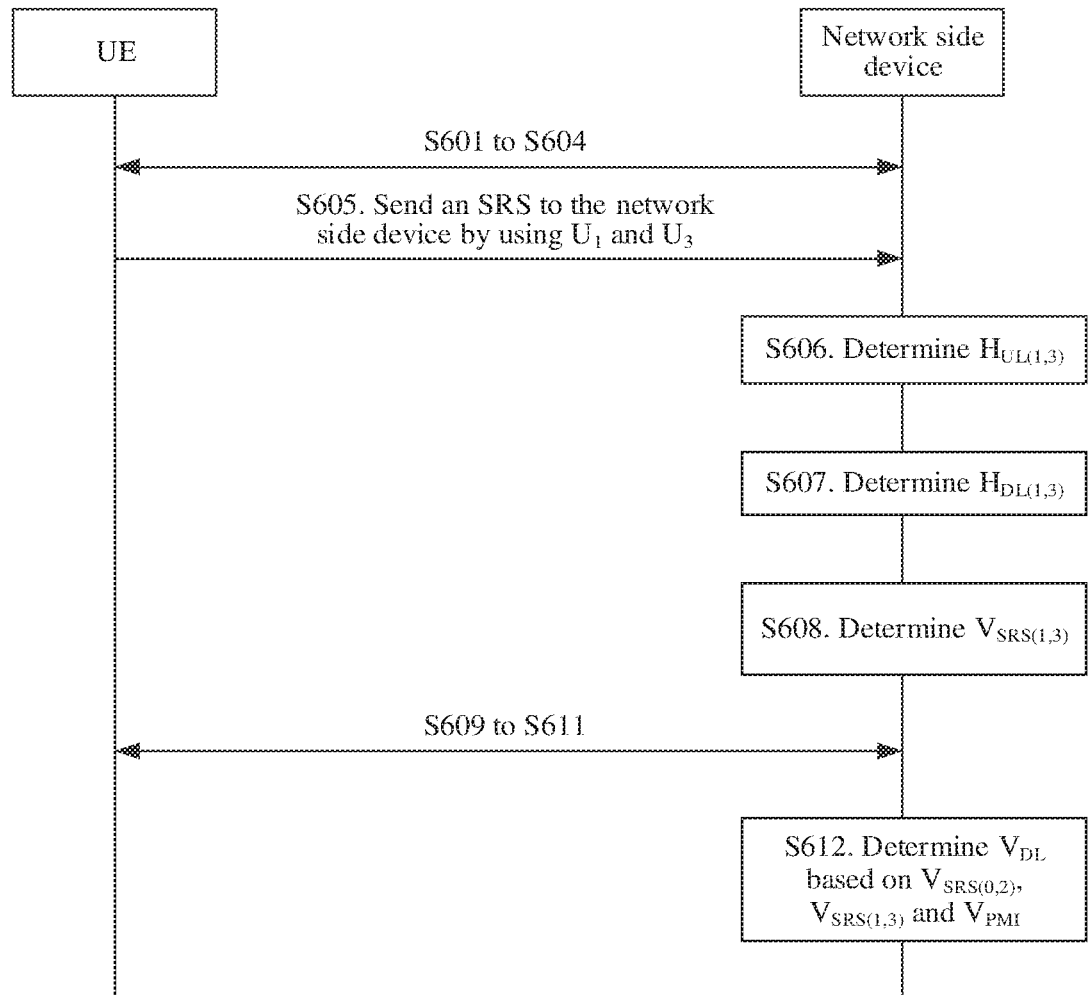
FIG. 6 is an example schematic flowchart of a method for obtaining downlink channel information.

FIG. 6 shows another process of obtaining downlink channel information.

For S601 to S604, can refer to step S401 to step S404 shown in FIG. 4.

S605. The UE sends an SRS to the network side device by using $U_1$ and $U_3$.

There is no strict sequence between step S605 and step S601. Step S605 may be performed before step S601, or may be performed after step S601. This is not specifically limited in this embodiment of this application.

S606. The network side device determines, based on the SRS received from $U_1$ and $U_3$ by $E_0$ to $E_{63}$, an uplink channel gain matrix $H_{UL(1, 3)}$ that corresponds to $U_1$ and that corresponds to $U_3$.

For details of a method for determining $H_{UL(1, 3)}$ by the network side device, refer to step S402 shown in FIG. 4.

S607. The network side device determines a downlink channel gain matrix $H_{DL(1, 3)}$ that corresponds to $U_1$ and that corresponds to $U_3$, where $H_{DL(1, 3)}$ is as follows:

$$H_{UL(1,3)} = H_{DL(1,3)}$$

For details of a method for determining $H_{DL(1, 3)}$ by the network side device, refer to step S403 shown in FIG. 4.

S608. The network side device determines a corresponding weight matrix $V_{SRS(1,3)}$ based on $H_{DL(1, 3)}$.

For details of a method for determining $V_{SRS(1,3)}$ by the network side device, refer to step S404 shown in FIG. 4.

For S609 to S611, refer to step S505 to step S507 shown in FIG. 5.

S612. The network side device determines $V_{DL}$ in any one of the following manners based on $V_{SRS(0,2)}$, $V_{SRS(1,3)}$, and $V_{PMI}$.

Manner 1. The network side device concatenates $V_{SRS(0,2)}$ and $V_{SRS(1,3)}$ to obtain $V_{SRS}'$, and multiplies $V_{SRS}'$ by $V_{PMI}$ to obtain $V_{DL}$.

Manner 2. The network side device concatenates $V_{SRS(0,2)}$ and $V_{SRS(1,3)}$ to obtain $V_{SRS}'$, adjusts a size of a matrix element in $V_{SRS}'$, and multiplies the adjusted $V_{SRS}'$ by $V_{PMI}$ to obtain $V_{DL}$.

Manner 3. The network side device concatenates $V_{SRS(0,2)}$ and $V_{SRS(1,3)}$ to obtain $V_{SRS}'$, adjusts a size of a matrix element in $V_{SRS}'$, and multiplies $V_{SRS}'$ by the adjusted $V_{PMI}$ to obtain $V_{DL}$.

Manner 4. The network side device concatenates $V_{SRS(0,2)}$ and $V_{SRS(1,3)}$ to obtain $V_{SRS}'$, adjusts a size of a matrix element in $V_{SRS}'$ and a size of a matrix element in $V_{PMI}$, and multiplies the adjusted $V_{SRS}'$ by the adjusted $V_{PMI}$ to obtain $V_{DL}$.

Manner 5. When step S605 is performed before step S601, the network side device may further determine an m-column matrix in $V_{PMI}$, where a rank of the m-column matrix is equal to a rank of $V_{SRS(1,3)}$.

Figure 7:
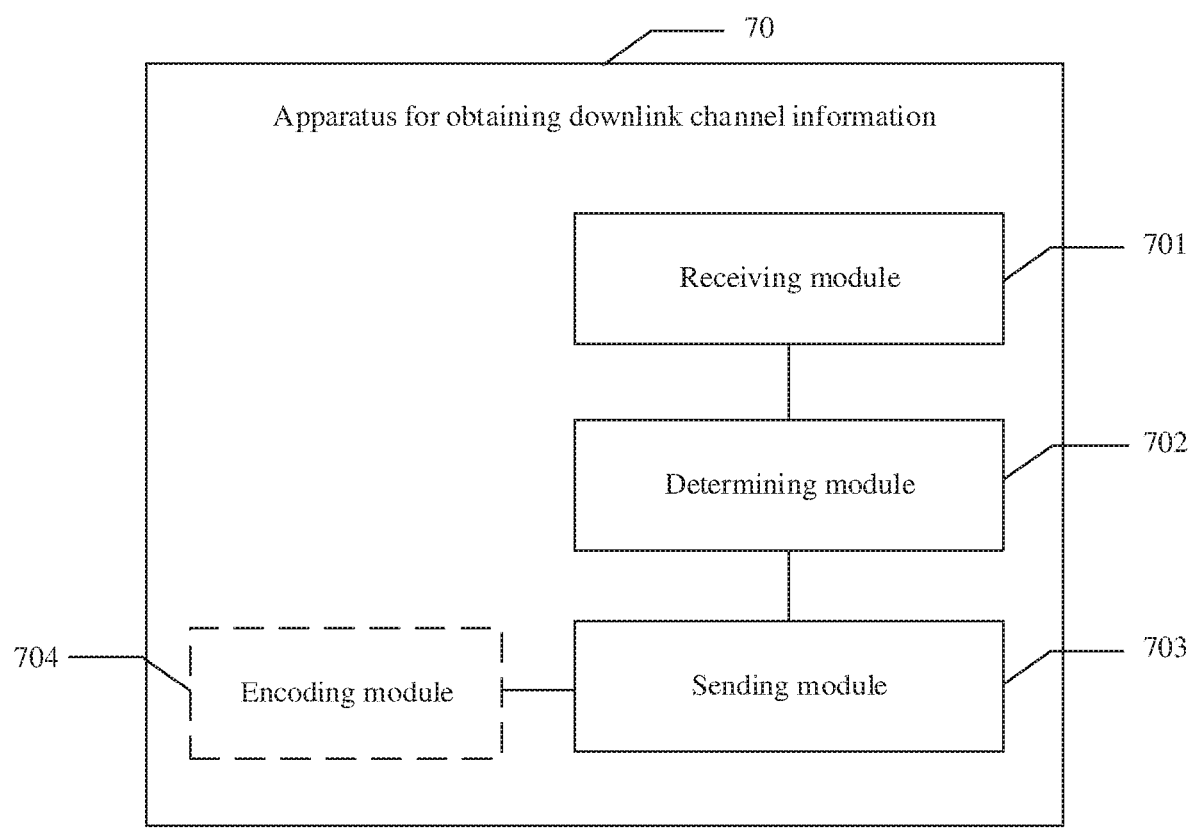
FIG. 7 is an example schematic structural diagram of an apparatus for obtaining downlink channel information.

Based on a same technical concept as the method embodiments, an embodiment of this application provides, at least, an apparatus for obtaining downlink channel information, and the apparatus is specifically configured to implement the methods described in the embodiments in FIG. 2 to FIG. 6. The apparatus may be applied to a network side device. A structure of the apparatus is shown in FIG. 7, and the apparatus includes: a receiving module 701, a determining module 702, and a sending module 703. The receiving module 701 is configured to receive a first pilot signal sent by user equipment by using N first antenna ports. The determining module 702 is configured to: determine, based on the first pilot signal received by the receiving module 701, a downlink channel gain matrix corresponding to the N first antenna ports, where N is an integer greater than 0, and determine, based on the downlink channel gain matrix corresponding to the N first antenna ports, a first weight matrix corresponding to the N first antenna ports. The first weight matrix is used to represent downlink channel information corresponding to the N first antenna ports. The sending module 703 is configured to send a second pilot signal to the user equipment. The receiving module 701 is further configured to receive a precoding matrix indicator PMI fed back by the user equipment, where the PMI is determined by the user equipment based on a second pilot signal received by using P antenna ports. The P antenna ports include M second antenna ports and at least one first antenna port, or the P antenna ports include M second antenna ports. The determining module 702 is further configured to: determine a second weight matrix based on the PMI received by the receiving module 701, where the second weight matrix is used to represent downlink channel information corresponding to the P receiving ports; and determine, based on the first weight matrix and the second weight matrix, downlink channel information that corresponds to the N first antenna ports and that corresponds to the M second antenna ports.

If the PMI is determined by the user equipment based on the second pilot signal received by using the M second antenna ports, when determining, based on the first weight matrix and the second weight matrix, the downlink channel information that corresponds to the N first antenna ports and that corresponds to the M second antenna ports, the determining module 702 is configured to concatenate the first weight matrix and the second weight matrix, to obtain the downlink channel information that corresponds to the N first antenna ports and that corresponds to the M second antenna ports.

If the PMI is determined by the user equipment based on the second pilot signal received by using the M second antenna ports and the at least one first antenna port, when determining, based on the first weight matrix and the second weight matrix, the downlink channel information that corresponds to the N first antenna ports and that corresponds to the M second antenna ports, the determining module 702 is specifically configured to: determine an m-column matrix in the second weight matrix, and concatenate the first weight matrix and the m-column matrix in the second weight matrix, to obtain the downlink channel information that corresponds to the N first antenna ports and that corresponds to the M second antenna ports, where m is an integer greater than 0 and less than a quantity of columns of the second weight matrix.

Before the receiving a first pilot signal sent by user equipment by using N first antenna ports, the receiving module 701 may be further configured to receive the first pilot signal sent by the user equipment by using the M second antenna ports. The determining module 702 may be further configured to: determine, based on the first pilot signal received by the receiving module 701, a downlink channel gain matrix corresponding to the M second antenna ports, and determine, based on the downlink channel gain matrix corresponding to the M second antenna ports, a third weight matrix corresponding to the M second antenna ports. The third weight matrix is used to represent the downlink channel information corresponding to the M second antenna ports. When determining the m-column matrix in the second weight matrix, the determining module 702 may specifically be configured to determine the m-column matrix in the second weight matrix, where a rank of the m-column matrix is equal to a rank of the third weight matrix.

If the PMI is determined by the user equipment based on the second pilot signal received by using the M second antenna ports and the N first antenna ports, after the receiving a first pilot signal sent by user equipment by using N first antenna ports, the receiving module 701 may be further configured to receive the first pilot signal sent by the user equipment by using the M second antenna ports. The determining module 702 may be further configured to: determine, based on the first pilot signal received by the receiving module 701, a downlink channel gain matrix corresponding to the M second antenna ports, and determine, based on the downlink channel gain matrix corresponding to the M second antenna ports, a fourth weight matrix corresponding to the M second antenna ports. The fourth weight matrix is used to represent the downlink channel information corresponding to the M second antenna ports. When determining, based on the first weight matrix and the second weight matrix, the downlink channel information that corresponds to the N first antenna ports and that corresponds to the M second antenna ports, the determining module 702 may specifically be configured to: concatenate the first weight matrix and the fourth weight matrix to obtain a fifth weight matrix, and adjust the fifth weight matrix based on the second weight matrix, to obtain the downlink channel information that corresponds to the N first antenna ports and that corresponds to the M second antenna ports.

In a possible implementation, when adjusting the fifth weight matrix based on the second weight matrix, the determining module 702 may specifically be configured to multiply the second weight matrix by the fifth weight matrix.

In a possible implementation, when adjusting the fifth weight matrix based on the second weight matrix, the determining module 702 may specifically be configured to: adjust a size of a matrix element in the second weight matrix and/or the fifth weight matrix and multiply the adjusted second weight matrix by the adjusted fifth weight matrix.

When determining, based on the downlink channel gain matrix corresponding to the N first antenna ports, the first weight matrix corresponding to the N first antenna ports, the determining module 702 may specifically be configured to: determine an H*H-order orthogonal matrix of the downlink channel gain matrix corresponding to the N first antenna ports, and a rank of the downlink channel gain matrix corresponding to the N first antenna ports. H can include a quantity of receiving ports of the network side device. Then the determining module 702 determines first n columns of the H*H-order orthogonal matrix as the first weight matrix. It should be appreciated that n can be equal to the rank of the downlink channel gain matrix corresponding to the N first antenna ports.

The apparatus further includes an encoding module 704, configured to perform precoding weighting on the second pilot signal based on a preset weight matrix. When sending the second pilot signal to the user equipment, the sending module 703 may specifically be configured to send the weighted second pilot signal to the user equipment. When determining the second weight matrix based on the PMI, the determining module 702 is specifically configured to multiply the preset weight matrix by the PMI to obtain the second weight matrix.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The integrated module may be implemented in a form of hardware, or may be implemented in a form of a software functional module, or a combination of both.

Figure 8:
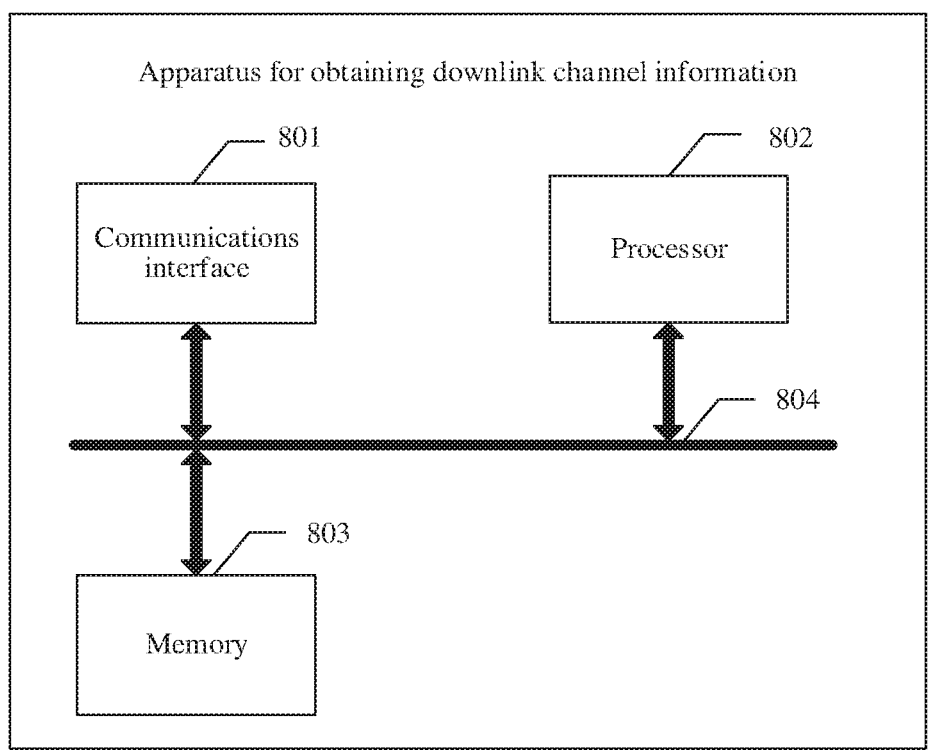
FIG. 8 is an example schematic structural diagram of an apparatus for obtaining downlink channel information.

When the integrated module may be implemented in a form of hardware, as shown in FIG. 8, the apparatus for obtaining downlink channel information may include a processor 802. The hardware of the entity corresponding to the module may be the processor 802. The processor 802 may be a central processing unit (CPU), a digital processing module, or the like. The apparatus for obtaining downlink channel information may further include a communications interface 801, and the processor 802 receives and sends data by using the communications interface 801. The apparatus further includes a memory 803, configured to store a program executed by the processor 802. The memory 803 may be a non-volatile memory such as a hard disk (HDD) or a solid-state drive (SSD), or may be a volatile memory, for example, a random-access memory (RAM). The memory 803 is any other medium that can be configured to carry or store expected program code in a form of an instruction or a data structure and that can be accessed by a computer, but is not limited thereto.

The processor 802 is configured to execute the program code stored in the memory 803, and is specifically configured to perform the method described in the embodiment shown in FIG. 2 or FIG. 6. Reference may be made to the method described in the embodiment shown in FIG. 2 or FIG. 6.

A specific connection medium among the communications interface 801, the processor 802, and the memory 803 is not limited in the embodiments of this application. In the embodiments of this application, in FIG. 8, the memory 803, the processor 802, and the communications interface 801 are connected to each other by using a bus 804. The bus 804 is represented by using a bold line in FIG. 8. A manner of connection between other components is only for schematic description, but is not used as a limitation. The bus 804 may be classified into an address bus, a data bus, a control bus, or the like. For ease of representation, only one thick line is used to represent the bus 804 in FIG. 8, but this does not mean that there is only one bus 804 or only one type of bus 804.

An embodiment of this application further provides a computer-readable storage medium, configured to store a computer software instruction that needs to be executed for execution of the foregoing processor, and the computer software instruction includes a program that needs to be executed for execution of the foregoing processor.

An embodiment of the present application further provides a chip. The chip includes the foregoing communications interface 801 and the foregoing processor 802, and is configured to support a network side device in implementing any one of the methods described in the embodiments shown in FIG. 2 to FIG. 6.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It should be appreciated that a person skilled in the art can make various modifications and variations to this application without departing from the spirit and scope of this application. This application is intended to cover these modifications and variations of this application provided that they fall within the scope defined by the following claims and their equivalent technologies.

What is claimed is:

1. A method implemented via a network side device and for obtaining downlink channel information, the method comprising:
   receiving a first pilot signal sent by user equipment by using N first antenna ports;
   determining, based on the received first pilot signal, a downlink channel gain matrix corresponding to the N first antenna ports, wherein N is an integer greater than 0;
   determining, based on the downlink channel gain matrix corresponding to the N first antenna ports, a first weight matrix corresponding to the N first antenna ports, wherein the first weight matrix represents downlink channel information corresponding to the N first antenna ports;
   sending a second pilot signal to the user equipment;
   receiving a precoding matrix indicator (PMI) fed back by the user equipment, wherein the PMI is determined by the user equipment based on the second pilot signal received by using P antenna ports, wherein the P antenna ports comprise (a) M second antenna ports and at least one first antenna port, or (b) the M second antenna ports, wherein P and M are integers greater than 0, and P is greater than or equal to M;
   determining a second weight matrix based on the PMI, wherein the second weight matrix represents downlink channel information corresponding to P receiving ports; and
   determining, based on the first weight matrix and the second weight matrix, downlink channel information that corresponds to the N first antenna ports and that corresponds to the M second antenna ports.

2. The method according to claim 1, wherein
the PMI is determined by the user equipment based on the second pilot signal received by using the M second antenna ports, and
determining the downlink channel information that corresponds to the N first antenna ports and that corresponds to the M second antenna ports comprises:
   concatenating, by the network side device, the first weight matrix and the second weight matrix to obtain the downlink channel information that corresponds to the N first antenna ports and that corresponds to the M second antenna ports.

3. The method according to claim 1, wherein
the PMI is determined by the user equipment based on the second pilot signal received by using the M second antenna ports and the at least one first antenna port, and
determining the downlink channel information that corresponds to the N first antenna ports and that corresponds to the M second antenna ports comprises:
   determining, by the network side device, an m-column matrix in the second weight matrix; and
   concatenating the first weight matrix and the m-column matrix in the second weight matrix, to obtain the downlink channel information that corresponds to the N first antenna ports and that corresponds to the M second antenna ports, wherein m is an integer greater than 0 and less than a quantity of columns of the second weight matrix.

4. The method according to claim 3, further comprising:
before receiving the first pilot signal sent by user equipment by using N first antenna ports:
   receiving the first pilot signal sent by the user equipment by using the M second antenna ports;
   determining, based on the received first pilot signal, a downlink channel gain matrix corresponding to the M second antenna ports; and
   determining, by the network side device based on the downlink channel gain matrix corresponding to the M second antenna ports, a third weight matrix corresponding to the M second antenna ports, wherein the third weight matrix is used to represent the downlink channel information corresponding to the M second antenna ports, wherein
determining the m-column matrix in the second weight matrix comprises:
   determining, by the network side device, the m-column matrix in the second weight matrix based on the third weight matrix, wherein a rank of the m-column matrix is equal to a rank of the third weight matrix.

5. The method according to claim 1, wherein
the PMI is determined by the user equipment based on the second pilot signal received by using the M second antenna ports and the N first antenna ports, and
after receiving the first pilot signal sent by the user equipment by using N first antenna ports, the method further comprises:
   receiving, by the network side device, the first pilot signal sent by the user equipment by using the M second antenna ports;
   determining, based on the received first pilot signal, a downlink channel gain matrix corresponding to the M second antenna ports; and
   determining, by the network side device based on the downlink channel gain matrix corresponding to the M second antenna ports, a fourth weight matrix corresponding to the M second antenna ports, wherein the fourth weight matrix is used to represent the downlink channel information corresponding to the M second antenna ports, wherein
determining the downlink channel information that corresponds to the N first antenna ports and that corresponds to the M second antenna ports comprises:
   concatenating, by the network side device, the first weight matrix with the fourth weight matrix to obtain a fifth weight matrix; and
   adjusting, by the network side device, the fifth weight matrix based on the second weight matrix, to obtain the downlink channel information that corresponds to the N first antenna ports and that corresponds to the M second antenna ports.

6. The method according to claim 5, wherein adjusting the fifth weight matrix based on the second weight matrix comprises:
   multiplying, by the network side device, the second weight matrix by the fifth weight matrix.

7. The method according to claim 5, wherein adjusting the fifth weight matrix based on the second weight matrix comprises:
   adjusting, by the network side device, a size of a matrix element in the second weight matrix and/or the fifth weight matrix; and
   multiplying, by the network side device, the adjusted second weight matrix by the adjusted fifth weight matrix.

8. The method according to claim 1, wherein determining the first weight matrix corresponding to the N first antenna ports comprises:
   determining, by the network side device, an H*H-order orthogonal matrix of the downlink channel gain matrix corresponding to the N first antenna ports, and a rank of the downlink channel gain matrix corresponding to the N first antenna ports, wherein H is a quantity of receiving ports of the network side device; and
   determining, by the network side device, first n columns of the H*H-order orthogonal matrix as the first weight matrix, wherein n is equal to the rank of the downlink channel gain matrix corresponding to the N first antenna ports.

9. The method according to claim 1, wherein sending the second pilot signal to the user equipment comprises:
   performing, by the network side device, precoding weighting on the second pilot signal based on a preset weight matrix; and
   sending, by the network side device, the weighted second pilot signal to the user equipment, where
   determining the second weight matrix based on the PMI comprises:
   multiplying, by the network side device, the preset weight matrix by the PMI to obtain the second weight matrix.

10. An apparatus for obtaining downlink channel information, comprising:
    a transceiver configured to receive a first pilot signal sent by user equipment by using N first antenna ports, wherein N is an integer greater than 0;
    a processor operatively coupled to the transceiver, the processor configured to:
      determine, based on the first pilot signal received by the transceiver, a downlink channel gain matrix corresponding to the N first antenna ports; and
      determine, based on the downlink channel gain matrix corresponding to the N first antenna ports, a first weight matrix corresponding to the N first antenna ports, wherein the first weight matrix is used to represent downlink channel information corresponding to the N first antenna ports, wherein
    the transceiver is further configured to:
      send a second pilot signal to the user equipment; and
      receive a precoding matrix indicator (PMI) fed back by the user equipment, wherein the PMI is determined by the user equipment based on a second pilot signal received by using P antenna ports, wherein the P antenna ports comprise (a) M second antenna ports and at least one first antenna port, or (b) M second antenna ports, wherein P and M are integers greater than 0, and P is greater than or equal to M; and wherein
    the processor is further configured to:
      determine a second weight matrix based on the PMI received by the transceiver, wherein the second weight matrix is used to represent downlink channel information corresponding to the P receiving ports; and
      determine, based on the first weight matrix and the second weight matrix, downlink channel information that corresponds to the N first antenna ports and that corresponds to the M second antenna ports.

11. The apparatus according to claim 10, wherein
    the PMI is determined by the user equipment based on the second pilot signal received by using the M second antenna ports, and
    when determining the downlink channel information that corresponds to the N first antenna ports and that corresponds to the M second antenna ports, the processor is further configured to:
    concatenate the first weight matrix and the second weight matrix to obtain the downlink channel information that corresponds to the N first antenna ports and that corresponds to the M second antenna ports.

12. The apparatus according to claim 10, wherein
    the PMI is determined by the user equipment based on the second pilot signal received by using the M second antenna ports and the at least one first antenna port, and
    when determining the downlink channel information that corresponds to the N first antenna ports and that corresponds to the M second antenna ports, the processor is further configured to:
      determine an m-column matrix in the second weight matrix; and
      concatenate the first weight matrix and the m-column matrix in the second weight matrix, to obtain the downlink channel information that corresponds to the N first antenna ports and that corresponds to the M second antenna ports, wherein m is an integer greater than 0 and less than a quantity of columns of the second weight matrix.

13. The apparatus according to claim 12, wherein before receiving the first pilot signal sent by user equipment by using N first antenna ports, the transceiver is further configured to:
    receive the first pilot signal sent by the user equipment by using the M second antenna ports; and
    the processor is further configured to:
    determine, based on the first pilot signal received by the transceiver, a downlink channel gain matrix corresponding to the M second antenna ports; and
    determine, based on the downlink channel gain matrix corresponding to the M second antenna ports, a third weight matrix corresponding to the M second antenna ports, wherein the third weight matrix is used to represent the downlink channel information corresponding to the M second antenna ports; and
    when determining the m-column matrix in the second weight matrix, the processor is further configured to:
    determine the m-column matrix in the second weight matrix based on the third weight matrix, wherein a rank of the m-column matrix is equal to a rank of the third weight matrix.

14. The apparatus according to claim 10, wherein
the PMI is determined by the user equipment based on the second pilot signal received by using the M second antenna ports and the N first antenna ports; and
after receiving the first pilot signal sent by user equipment by using N first antenna ports, the transceiver is further configured to:
  receive the first pilot signal sent by the user equipment by using the M second antenna ports; and
the processor is further configured to:
  determine, based on the first pilot signal received by the transceiver, a downlink channel gain matrix corresponding to the M second antenna ports; and
  determine, based on the downlink channel gain matrix corresponding to the M second antenna ports, a fourth weight matrix corresponding to the M second antenna ports, wherein the fourth weight matrix is used to represent the downlink channel information corresponding to the M second antenna ports; and
when determining the downlink channel information that corresponds to the N first antenna ports and that corresponds to the M second antenna ports, the processor is further configured to:
  concatenate the first weight matrix and the fourth weight matrix to obtain a fifth weight matrix; and
  adjust the fifth weight matrix based on the second weight matrix, to obtain the downlink channel information that corresponds to the N first antenna ports and that corresponds to the M second antenna ports.

15. The apparatus according to claim 14, wherein when adjusting the fifth weight matrix based on the second weight matrix, the processor is further configured to:
  multiply the second weight matrix by the fifth weight matrix.

16. The apparatus according to claim 14, wherein when adjusting the fifth weight matrix based on the second weight matrix, the processor is further configured to:
  adjust a size of a matrix element in the second weight matrix and/or the fifth weight matrix; and
  multiply the adjusted second weight matrix by the adjusted fifth weight matrix.

17. The apparatus according to claim 10, wherein when determining the first weight matrix corresponding to the N first antenna ports, the processor is further configured to:
  determine an H*H-order orthogonal matrix of the downlink channel gain matrix corresponding to the N first antenna ports, and a rank of the downlink channel gain matrix corresponding to the N first antenna ports, wherein H is a quantity of receiving ports of the network side device; and
  determine first n columns of the H*H-order orthogonal matrix as the first weight matrix, wherein n is equal to the rank of the downlink channel gain matrix corresponding to the N first antenna ports.

18. The apparatus according to claim 10, wherein
the processor is further configured to perform precoding weighting on the second pilot signal based on a preset weight matrix,
  when sending the second pilot signal to the user equipment, the transceiver is configured to send the weighted second pilot signal to the user equipment, and
  when determining the second weight matrix based on the PMI, the processor is configured to multiply the preset weight matrix by the PMI to obtain the second weight matrix.

19. A non-transitory computer readable storage medium configured to store computer readable instructions that, when executed by a processor of an information processing system, cause the information processing system to provide execution comprising:
  receiving a first pilot signal sent by user equipment by using N first antenna ports;
  determining, based on the received first pilot signal, a downlink channel gain matrix corresponding to the N first antenna ports, wherein N is an integer greater than 0;
  determining, based on the downlink channel gain matrix corresponding to the N first antenna ports, a first weight matrix corresponding to the N first antenna ports, wherein the first weight matrix is used to represent downlink channel information corresponding to the N first antenna ports;
  sending a second pilot signal to the user equipment;
  receiving a precoding matrix indicator (PMI) fed back by the user equipment, wherein the PMI is determined by the user equipment based on the second pilot signal received by using P antenna ports, wherein the P antenna ports comprise (a) M second antenna ports and at least one first antenna port, or (b) the M second antenna ports, wherein P and M are integers greater than 0, and P is greater than or equal to M;
  determining a second weight matrix based on the PMI, wherein the second weight matrix is used to represent downlink channel information corresponding to P receiving ports; and
  determining, based on the first weight matrix and the second weight matrix, downlink channel information that corresponds to the N first antenna ports and that corresponds to the M second antenna ports.

20. The non-transitory computer readable storage medium of claim 19, wherein
the PMI is determined by the user equipment based on the second pilot signal received by using the M second antenna ports, and
determining the downlink channel information that corresponds to the N first antenna ports and that corresponds to the M second antenna ports comprises:
  concatenating, by a network side device, the first weight matrix and the second weight matrix to obtain the downlink channel information that corresponds to the N first antenna ports and that corresponds to the M second antenna ports.

* * * * *